(12) United States Patent
Gray et al.

(10) Patent No.: US 11,102,003 B2
(45) Date of Patent: Aug. 24, 2021

(54) LEDGER-INDEPENDENT TOKEN SERVICE

(71) Applicant: Microsoft Technology Licensing, LLC, Redmond, WA (US)

(72) Inventors: John Marley Gray, Charlotte, NC (US); Gregory Philip Cignavitch, Duvall, WA (US); Supriya Madhuram, Redmond, WA (US); Nayana Singh Patel, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 370 days.

(21) Appl. No.: 16/284,410

(22) Filed: Feb. 25, 2019

(65) Prior Publication Data
US 2020/0274712 A1 Aug. 27, 2020

(51) Int. Cl.
*H04L 29/06* (2006.01)
*H04L 9/32* (2006.01)
*G06F 21/62* (2013.01)
*H04L 9/06* (2006.01)

(52) U.S. Cl.
CPC .......... *H04L 9/3213* (2013.01); *G06F 21/62* (2013.01); *H04L 9/0637* (2013.01); *H04L 2209/38* (2013.01)

(58) Field of Classification Search
CPC . H04L 9/3213; H04L 9/0637; H04L 2209/38; H04L 2209/56; H04L 9/3247; H04L 63/00; H04L 9/3239; G06F 21/62; G06Q 2220/00; G06Q 20/223; G06Q 40/04; G06Q 20/065; G06Q 10/06315
See application file for complete search history.

(56) References Cited

U.S. PATENT DOCUMENTS

| | | | |
|---|---|---|---|
| 9,584,517 B1 | 2/2017 | Roth et al. | |
| 10,373,129 B1 * | 8/2019 | James | H04L 9/3247 |
| 10,891,613 B1 * | 1/2021 | Schindler | G06Q 20/3678 |
| 2003/0093780 A1 | 5/2003 | Freudenberger et al. | |
| 2011/0314271 A1 | 12/2011 | Boccon-Gibod et al. | |

(Continued)

OTHER PUBLICATIONS

"Interledger Architecture", Retrieved From: https://interledger.org/rfcs/0001-interledger-architecture/, Oct. 19, 2018, 9 Pages.

(Continued)

*Primary Examiner* — Harunur Rashid

(57) ABSTRACT

Techniques for implementing a ledger-independent token service are provided. According to one set of embodiments, a computer system executing the service can receive, from a user, a request to create a token on a distributed ledger network. The computer system can further provide to the user one or more token templates, where each token template corresponds to a type of physical or digital asset and defines a set of one or more attributes and one or more control functions associated with the type. The computer system can then receive, from the user, a selection of a token template in the one or more token templates and create the token on the distributed ledger network, where the created token includes the set of one or more attributes and one or more control functions defined in the selected token template.

23 Claims, 5 Drawing Sheets

(56) References Cited

U.S. PATENT DOCUMENTS

| | | | |
|---|---|---|---|
| 2015/0358161 A1* | 12/2015 | Kancharla | G06F 21/602 |
| | | | 713/164 |
| 2016/0092988 A1 | 3/2016 | Letourneau | |
| 2016/0292672 A1 | 10/2016 | Fay et al. | |
| 2017/0111175 A1 | 4/2017 | Oberhauser et al. | |
| 2018/0330343 A1 | 11/2018 | Gray | |
| 2020/0005284 A1* | 1/2020 | Vijayan | G06Q 20/065 |
| 2020/0258061 A1* | 8/2020 | Beadles | G06Q 20/3678 |

OTHER PUBLICATIONS

Misra, Shivendra, "ERC20 Token Standard: A Beginners Guide—CryptoX—Medium", Retrieved From: https://medium.com/cryptoxtech/erc20-token-standard-a-beginners-guide-5b5f0c87e11f, Jun. 29, 2018, 9 Pages.

"International Search Report and Written Opinion Issued in PCT Application No. PCT/US20/017390", dated Apr. 20, 2020, 11 Pages.

Pustisek, Matevz, et al., "Approaches to Front-End IoT Application Development for the Ethereum Blockchain", Published in Procedia Computer Science, vol. 129, Jan. 1, 2018, pp. 410-419.

Rosenfeld, Meni, "Overview of Colored Coins", Retrieved From: https://bitcoil.co.il/BitcoinX.pdf, Dec. 4, 2012, 13 Pages.

"Blockchain as a Service", Retrieved from: https://www.cccinnovationcenter.com/wp-content/uploads/2017/01/Blockchain-DCSummit.pptx, May 12, 2017, pp. 1-17.

"Tendermint Added to Azure", Retrieved From: https://web.archive.org/web/20160322211032/http://www.coindesk.com/press-releases/tendermint-added-to-azure/, Mar. 18, 2016, 2 Pages.

Buterin, Vitalik, "Thoughts on UTXOs", Retrieved from: https://medium.com/©ConsenSys/thoughts-on-utxo-by-vitalik-buterin-2bb782c67e53, Mar. 9, 2016, 5 Pages.

"Non Final Office Action Issued in U.S. Appl. No. 15/593,001", dated Aug. 16, 2019, 19 Pages.

Forth, Steven, "In Early-stage Innovation the Product Manager Should Drive Pricing Decisions", Retrieved From: https://www.ibbaka.com/blog/2017/11/4/in-early-stage-innovation-the-product-manager-should-drive-pricing-decisions, Nov. 9, 2017, 6 Pages.

Gray, et al., "Anatomy of a Smart Contract", Retrieved From: https://github.com/Azure/azure-blockchain-projects/blob/master/bletchley/AnatomyofASmartContract.md, Apr. 17, 2017, 9 Pages.

Gray, Marley, "Bletchley—The Cryptlet Fabric & Evolution of Blockchain Smart Contracts", Retrieved From: http://www.dataarchitect.cloud/bletchley-the-cryptlet-fabric-evolution-of-blockchain-smart-contracts/, Feb. 9, 2017, 13 Pages.

Gray, Marley, "Introducing Project "Bletchley"—Microsoft's Blockchain Architecture Overview", Retrieved From: https://github.com/Azure/azure-blockchain-projects/blob/73148fe77023f7e1303fcceb66800f92862f0035/bletchley/bletchley-whitepaper.md, Apr. 9, 2017, 12 Pages.

Gray, et al., "Project Bletchley—The Cryptlet Fabric", Retrieved From: https://github.com/Azure/azure-blockchain-projects/blob/master/bletchley/CryptletsDeepDive.md, Apr. 17, 2017, 25 Pages.

Marn, et al., "Pricing New Products", In Journal of McKinsey Quarterly, Issue 3, Aug. 2003, pp. 40-49.

Nagpal, Praveen, "Developing Smart Contracts Using Solidity", Retrieved from: https://web.archive.org/web/20170728224421/https://www.chainthatcom/updates/2017/1/4/developing-smart-contracts-using-solidity, May 30, 2016, 3 Pages.

Ojha, Varun, "Writing Blockchain Chaincode in Go for Hyperledger Fabric v0.6", Retrieved from: https://web.archive.org/web/20170910042740/https://www.ibm.com/developerworks/cloud/library/cl-ibm-blockchain-chaincode-development-using-golang/index.html, Mar. 1, 2017, 17 Pages.

"International Search Report and Written Opinion Issued in PCT Application No. PCT/US18/027203", dated Jul. 12, 2018, 11 Pages.

Singh, Jagpreet, "Value-Based Pricing: Two Easy Steps to Implement and Two Common Pitfalls to Avoid", Retrieved From: https://www.forbes.com/sites/forbesbusinessdevelopmentcouncil/2017/07/27/value-based-pricing-two-easy-steps-to-implement-and-two-common-pitfalls-to-avoid/#4218a90c6413, Jul. 27, 2017, 4 Pages.

Zhang, et al., "Town Crier: An Authenticated Data Feed for Smart Contracts", In Proceedings of the ACM SIGSAC Conference on Computer and Communications Security, Oct. 24, 2016, pp. 270-282.

Betts, Beth, "Anatomy of a Smart Contract", Retrieved From: https://www.blockchain-expo.com/2017/02/featured/anatomy-smart-contract/, Feb. 14, 2017, 13 Pages.

* cited by examiner

US 11,102,003 B2

LEDGER-INDEPENDENT TOKEN SERVICE

BACKGROUND

A distributed ledger is a database of transactions (e.g., exchanges of assets or data) that is replicated and synchronized across nodes of a distributed network. Each node maintains a complete copy of the distributed ledger and updates its copy independently. To keep the disparate copies of the distributed ledger in sync, a consensus algorithm is employed that ensures the nodes agree on the order and content of ledger updates. In addition, cryptographic hashes and digital signatures are used to prevent (or at least allow easy detection of) data tampering and to guarantee that transactions recorded in the distributed ledger originated from their stated senders. The combination of these elements results in a verifiable, immutable history of transactions that does not need to be maintained by a central authority. Examples of platforms that can be used to implement distributed ledgers (known as distributed ledger technologies or DLTs) include Ethereum, Hyperledger Fabric, Quorum (Enterprise Ethereum Alliance), R3 Corda, and Chain Core.

In the context of a distributed ledger, a token is a representation of a physical or digital asset that can be exchanged among participants of the distributed ledger network and recorded in the distributed ledger. For example, a token can represent fiat currency, commodities (e.g., barrels of oil, coffee beans, etc.), financial instruments (e.g., bonds), digital media download codes, customer loyalty points, and so on. Many DLTs allow users to create and deploy their own custom tokens (in contrast to native tokens/coins such as BTC or ETH) for exchange and recordation in a distributed ledger. This enables the users to build applications that leverage these custom tokens to address various business needs (e.g., commodities trading, inventory track and trace, etc.). However, due to the current lack of standardization across DLTs and token implementations, the process of building such applications, particularly in scenarios that involve multi-ledger transactions and/or token reuse, can be difficult and cumbersome.

SUMMARY

Techniques for implementing a ledger-independent token service are provided. According to one set of embodiments, a computer system executing the service can receive, from a user, a request to create a token on a distributed ledger network. The computer system can further provide to the user one or more token templates, where each token template corresponds to a type of physical or digital asset and defines a set of one or more attributes and one or more control functions associated with the type. The computer system can then receive, from the user, a selection of a token template in the one or more token templates and create the token on the distributed ledger network, where the created token includes the set of one or more attributes and one or more control functions defined in the selected token template.

DETAILED DESCRIPTION

Figure 1:
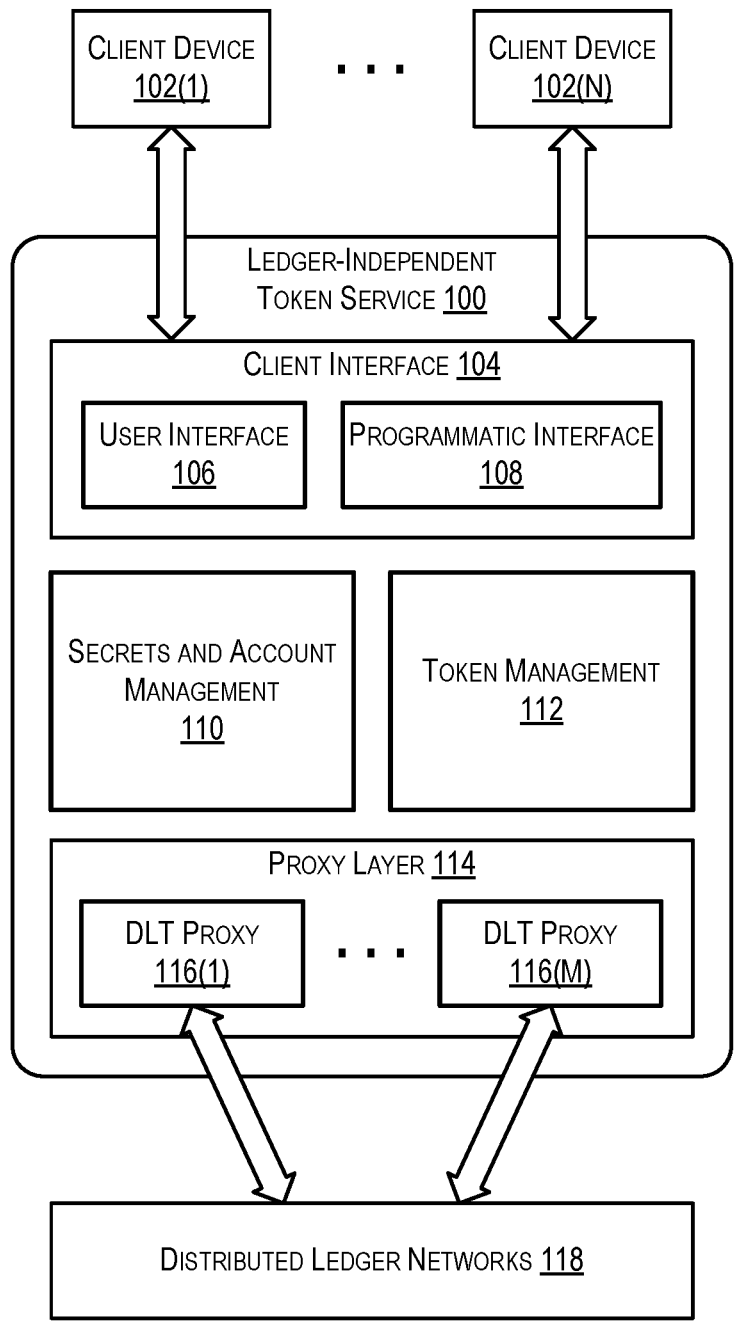
FIG. 1 depicts an architecture for a ledger-independent token service according to certain embodiments.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to a ledger-independent token service—in other words, a software service that enables users (e.g. individuals, organizations, automated agents/applications, etc.) to create, transact with, and manage tokens across multiple different distributed ledger networks/platforms in a common way.

As mentioned in the Background section, there is currently little to no standardization across DLTs in terms of the mechanisms provided to manage the lifecycle of tokens. For instance, Ethereum requires a certain set of tools/libraries for creating and interacting with tokens on Ethereum-based distributed ledgers, while Hyperledger Fabric (HLF) requires a different set of tools/libraries for creating and interacting with tokens on HLF-based distributed ledgers. This makes it cumbersome to build applications that involve multi-ledger token transactions (because the applications must implement the appropriate code for interfacing with each DLT) as well as build token-related business logic that applies to multiple different DLTs (because the same logic must be written, tested, and maintained across multiple DLT codebases). In addition, a custom token T1 created for one application may expose a completely different control interface than another custom token T2 created for another application, even if tokens T1 and T2 are functionally similar. This makes it difficult for tokens T1 and T2 to be reused in an efficient way for other applications/use cases/industries, since such reuse necessitates a detailed understanding of the code specific to each token.

The ledger-independent token service of the present disclosure addresses these and other problems by providing, among other things, (1) a mechanism for standardizing the tokenization of physical/digital assets and (2) a common interface for transacting with and managing all tokens, across all distributed ledger networks/platforms, created via the service. For example, with respect to (1), in certain embodiments the ledger-independent token service can maintain a set of token templates where each token template corresponds to a type or class of physical/digital asset and defines a set of attributes and control functions that are associated with (e.g., deemed appropriate for) assets of that type/class. At the time a user wishes to create a new (i.e., custom) token on a distributed ledger network for representing some physical or digital asset, the user can select one of the token templates that matches the type of the asset. The user can then invoke the ledger-independent token service to create (i.e., instantiate) and deploy the new token on the desired distributed ledger network based on the selected token template. Because the new token is instantiated from the selected token template, the new token will inherit and thus include all of the attributes and control functions of that template.

With respect to (2), once new tokens have been created and deployed as above, users can transact with and manage all of these tokens through a common interface exposed by the ledger-independent token service, regardless of the underlying distributed ledger networks/platforms on which the tokens have been deployed. In one set of embodiments, this common interface can include a message-based application programming interface (API) that accepts, as input, control messages corresponding to the control functions defined in the tokens. Upon receiving a control message for a particular token via this API (e.g., a transfer message for transferring some quantity of the token from a sender to a receiver), the ledger-independent token service can execute the corresponding control function of the token, generate a payload for a transaction to be submitted to the distributed ledger network where the token is deployed, and transform that payload into a format (e.g., a particular function call or message) understood by the distributed ledger network. The ledger-independent token service can then submit the transaction to the distributed ledger network for recordation thereon.

With the foregoing features, the ledger-independent token service can empower individuals and organizations to build applications and business logic involving tokens more easily and efficiently than before. For instance, because the token creation process employs token templates that abstract the functionality of tokens into asset classes comprising well-defined attributes/control functions and because each token instantiated from a given token template will include the same base attributes/control functions, application developers do not need to delve into token-specific code in order to interact with such tokens via their applications; instead, the developers can rely on the template-derived attributes/functions of the tokens to interact with them in a generic and portable fashion. This facilitates token reuse across applications/industries and shifts development focus away from figuring out implementation details and towards achieving business goals and driving business value.

Further, because the ledger-independent token service acts as a single and unified interface for managing the lifecycle of tokens across multiple different DLTs, application developers can write code for transacting with and managing tokens in a manner that is agnostic of the underlying distributed ledger networks/platforms on which the tokens are deployed. This makes development more efficient for emerging business use-cases that involve crossing ledger boundaries.

The foregoing and other aspects of the present disclosure are described in further detail in the sections that follow. It should be noted that the term "blockchain" is often used interchangeably with the term "distributed ledger" in the media, industry publications, etc.; however, a blockchain is technically a type of distributed ledger that organizes its data as an append-only sequence of cryptographically-linked blocks. Accordingly, the term "distributed ledger" as used herein should be broadly interpreted as including both blockchains and other types of distributed ledgers that do not employ this particular data structure/format.

2. Service Architecture

FIG. 1 is a high-level block diagram of a ledger-independent token service 100 (hereinafter referred to simply as "token service") according to certain embodiments. Token service 100 is communicatively coupled with a number of client devices 102(1)-(N), each of which is operated/controlled by a user (e.g., a person or an automated agent/application) of token service 100. In one set of embodiments, token service 100 may be implemented as a cloud-based service running on one or more computer systems in a public (e.g., Microsoft Azure, Amazon AWS, etc.), private (e.g., on-premises), or hybrid cloud computing environment.

As shown, token service 100 includes four main functional components: (1) a client interface 104 comprising a user interface (UI) 106 and a programmatic interface (API) 108, (2) a secrets and account management component 110, (3) a token management component 112, and (4) a proxy layer 114 comprising DLT proxies 116(1)-(M) connected to a number of distributed ledger networks 118.

Client interface 104 is the user-facing portion of token service 100 that enables users to interact with token service 100 in a standardized manner. These interactions can include creating new tokens for deployment on distributed ledger networks 118, transacting with (e.g., transferring) such tokens, and managing (e.g., minting, burning) such tokens. These interactions can also include creating a new service account on token service 100, logging into an existing service account, and managing aspects of an existing service account. In certain embodiments, UI 106 of client interface 104 may be implemented as a web-based portal or application that can be accessed via a standard web browser. Additionally, in certain embodiments API 108 of client interface 104 may be implemented as a message-based API (i.e., an API that receives requests and returns responses in the form of message payloads, rather than via a set of fixed-signature methods/functions).

Secrets and account management component 110 is generally responsible for handling the functions of token service 100 pertaining to service accounts and per-account cryptographic metadata (e.g., public/private keys) used for signing and submitting transactions to distributed ledger networks 118. For example, in various embodiments component 110 can handle the creation of new service accounts, authenticating user logins, and authorizing and retrieving cryptographic metadata for authenticated users. One benefit of having all cryptographic metadata for a given service account managed and secured by component 110 is that the user of the service account only needs to login to token service 100 in order to have access to all of his/her cryptographic keys, across multiple different distributed ledgers. Thus, there is no need for the user to manage this information himself/herself via, e.g., one or more separate distributed ledger wallet applications.

Token management component 112 is generally responsible for processing token-related operations requested by users via client interface 104, such as creating a new token on a distributed ledger network 118, transferring a quantity of a token from a sender to a receiver, minting a quantity of a token, burning a quantity of a token, querying metadata regarding a token, and so on. Although not shown in FIG. 1, in various embodiments token management component 112 can maintain a set of token templates which, as mentioned previously, can facilitate the creation and manipulation of tokens in a standardized way. Specific workflows that can be executed by token management component 112 (in conjunction with the other components of token service 100) for token creation, token control message processing, etc. are presented in sections (3), (4), and (5) below.

Finally, proxy layer 114 is an abstraction layer that abstracts away the details of interacting with distributed ledger networks 118 from users and the other components of token service 100. More particularly, each DLT proxy 116 of proxy layer 114 includes DLT-specific logic for communicating with a corresponding type of distributed ledger network 118. For example, if DLT proxy 116(1) is an Ethereum proxy, it will include logic for communicating with Ethereum-based distributed ledger networks. Similarly, if DLT proxy 116(2) is a HLF proxy, it will include logic for communicating with HLF-based distributed ledger networks. When a transaction needs to be submitted to a distributed ledger network of type X, information regarding the transaction will be routed to the DLT proxy corresponding to X. The DLT proxy can then manage the details of submitting the transaction to the network and ensuring the finality of the submitted transaction based on the network's underlying consensus algorithm. In some embodiments, as part of constructing a transaction for submission, each DLT proxy 116 can cooperate with secrets and account management component 110 to sign the transaction payload using an appropriate cryptographic key that is registered to the user that originated the transaction and is associated with the receiving distributed ledger network.

It should be appreciated that the depiction of token service 100 in FIG. 1 is illustrative and not intended to limit embodiments of the present disclosure. For example, depending on the implementation, the organization of components 102-116 and the mapping of functions to these components can differ. Further, in certain embodiments token service 100 may include additional components, sub-components, and/or functions that are not specifically described. One of ordinary skill in the art will recognize other variations, modifications, and alternatives.

3. Token Creation

Figure 2:
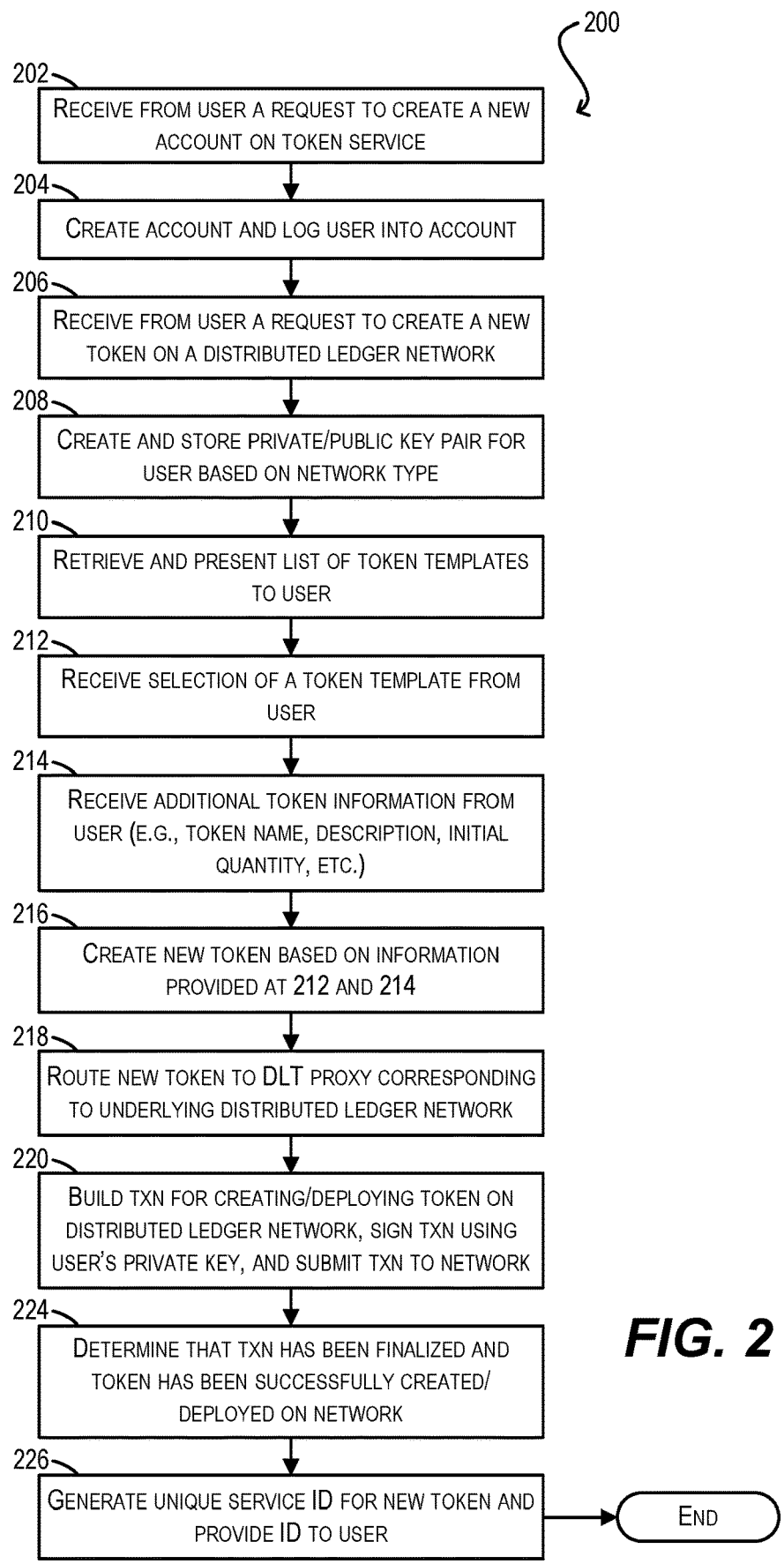
FIG. 2 depicts a workflow for creating a token according to certain embodiments.

FIG. 2 depicts a workflow 200 that can be executed by token service 100 of FIG. 1 for creating a new (i.e., custom) token on a distributed ledger network 118 according to certain embodiments. Workflow 200 assumes that (1) the user creating the token is a new user of token service 100, and (2) the user does not yet have cryptographic metadata (e.g., a private/public key pair) for use on the distributed ledger network, and thus includes initial steps for account and cryptographic metadata generation. In scenarios where assumptions (1) and (2) are invalid, these steps can be omitted.

Further, workflow 200 assumes that the token creation process in an interactive process between the user and token service 100 that is carried out via, e.g., UI 106 of client interface 104. However, in alternative embodiments the same results can be achieved via one or more token creation control messages that are submitted by the user to token service 100 using API 108.

Starting with block 202, token service 100 can receive, from the user via client interface 104, a request to create a new account on token service 100. This request can include a desired identifier/name for the new account as well as user-defined credentials (e.g., a password, PIN, etc.). In embodiments where token service 100 is part of a broader deployment of enterprise applications/services that include an enterprise-wide directory, the request can include a selection of an existing identity in the directory and the login credentials for that identity.

At block 204, secrets and account management component 110 can create the account using the provided identifier/name/identity, record the details of the account in an appropriate repository, and log the user into the newly created account.

At block 206, token service 100 can receive, from the user via client interface 104, a request to create a new token on a distributed ledger network 118. In various embodiments, this request can include an indication of the type/DLT of the distributed ledger network (e.g., Ethereum, HLF, etc.), as well as an address of at least one node in the network.

In response, token service 100 can create and store, via secrets and account management component 110, an appropriate private/public key pair for the user based on the network type (block 208). Token management component 112 of token service 100 can then retrieve and present to the user a list of token templates that may be used as the basis for creating the token (block 210).

As mentioned previously, each token template can represent a type/class of a physical or digital asset to be tokenized and can define a set of attributes and control functions that are deemed applicable to that asset type/class. When a token is created/instantiated from a token template, the token inherits all of the base attributes and control functions of the template. Thus, by asking the user to select a token template at the time of creating a token, token service 100 ensures that all tokens created via the service can be controlled in a generic way via its template-derived attributes/functions.

In one set of embodiments, the token templates presented to the user at block 210 can include a set of service-defined token templates that are designed to cover certain common types/classes of assets. These service-defined token templates can include, e.g., templates corresponding to (1) fungible assets (i.e., assets that are not unique and mutually interchangeable) with variable supply, (2) fungible assets with fixed supply, (3) non-fungible assets (i.e., assets that are unique) with variable supply, and (4) non-fungible assets with fixed supply. Examples of (1) include cash and stock shares, examples of (2) include bonds and movie tickets, examples of (3) include manufactured goods that are each associated with a unique serial number, and examples of (4) include titles to land and concert/sporting event tickets with reserved seating.

In particular embodiments, the token templates corresponding to asset classes (1) and (2) above can include the control functions listed in the following table. It should be noted that these lists are not exhaustive and functions may be added or removed in various implementations. In addition, the provided function names are exemplary and alternative names may be used to achieve the same functionality.

TABLE 1

| Token Template | Control Functions |
| --- | --- |
| Fungible Asset with Variable Supply | Balances - Retrieve list of all accounts and balances for the token<br>BalanceOf - Retrieve the balance of a specified account<br>Transfer - Transfer a quantity of the token from the general pool to a specified receiver account<br>TransferFrom - Transfer a quantity of the token from a specified sender account to a specified receiver account<br>Burn - Destroy a quantity of the token from the general pool<br>BurnFrom - Remove a quantity of the token from a specified account<br>AddMinter - Add a specified service account to a "minters group" that is allowed to mint new quantities of the token<br>RemoveMinter - Remove a specified service account from the minters group<br>Mint - Mint (i.e., issue) a new quantity of the token to the general pool<br>MintTo - Mint a new quantity of the token and transfer that quantity to a specified account |

TABLE 1-continued

| Token Template | Control Functions |
|---|---|
| Fungible Asset with Fixed Supply | Approve - Approve a maximum quantity of the token which an approved sender can transfer to a specified receiver account<br>Allowance - Retreive the maximum quantity of the token that a specified account is allowed to transfer<br>Balances - Retrieve list of all accounts and balances for the token<br>BalanceOf - Retrieve the balance of a specified account<br>Transfer - Transfer a quantity of the token from the general pool to a specified receiver account<br>TransferFrom - Transfer a quantity of the token from a specified sender account to a specified receiver account<br>Approve - Approve a maximum quantity of the token which an approved sender can transfer to a specified receiver account<br>Allowance - Retreive the maximum quantity of the token that a specified account is allowed to transfer |

Upon presenting the list of token templates, at block 212 token management component 112 can receive, from the user via client interface 104, a selection of a particular token template that the user believes most closely matches the asset being tokenized. For example, if the user is tokenizing a customer loyalty point asset (which is fungible and has variable supply), the user may select the "fungible asset with variable supply" template. In addition, at block 214, token management component 112 can receive from the user additional information regarding the new token such as token name, token description, token symbol (for listing on token exchanges), the number of decimals to which each unit of the token can be sub-divided, and an initial quantity of the token.

At block 216, token management component 112 can create the new token per the information provided at blocks 212 and 214. This can involve instantiating a new token object based on the selected token template and populating attributes of the object based on the provided token name, token description, etc. In certain embodiments, the instantiated token object can include default logic (as defined by token service 100) for each of the control functions inherited from its parent template. In other embodiments, token management component 112 can allow the user to provide custom logic for one or more of the template-derived control functions.

At block 218. token management component 112 can route the newly created token (e.g., instantiated token object) to a DLT proxy 116 that corresponds to the distributed ledger network 118 on which the token will be deployed. In response, that DLT proxy 116 can build a transaction for creating/deploying the token on distributed ledger network 118 per the rules/framework of the DLT, sign the transaction using the user's private key generated at block 208, and submit the transaction to distributed ledger network 118 (block 220).

At block 222, after some period of time, DLT proxy 116 can determine that the transaction has been finalized and the token has been successfully created/deployed on distributed ledger network 118. Finally, token management component 112 can generate a unique service ID for the new token and provide this ID to the user via client interface 104 (block 224), thereby ending the workflow.

4. Token Control Message Processing

Figure 3:
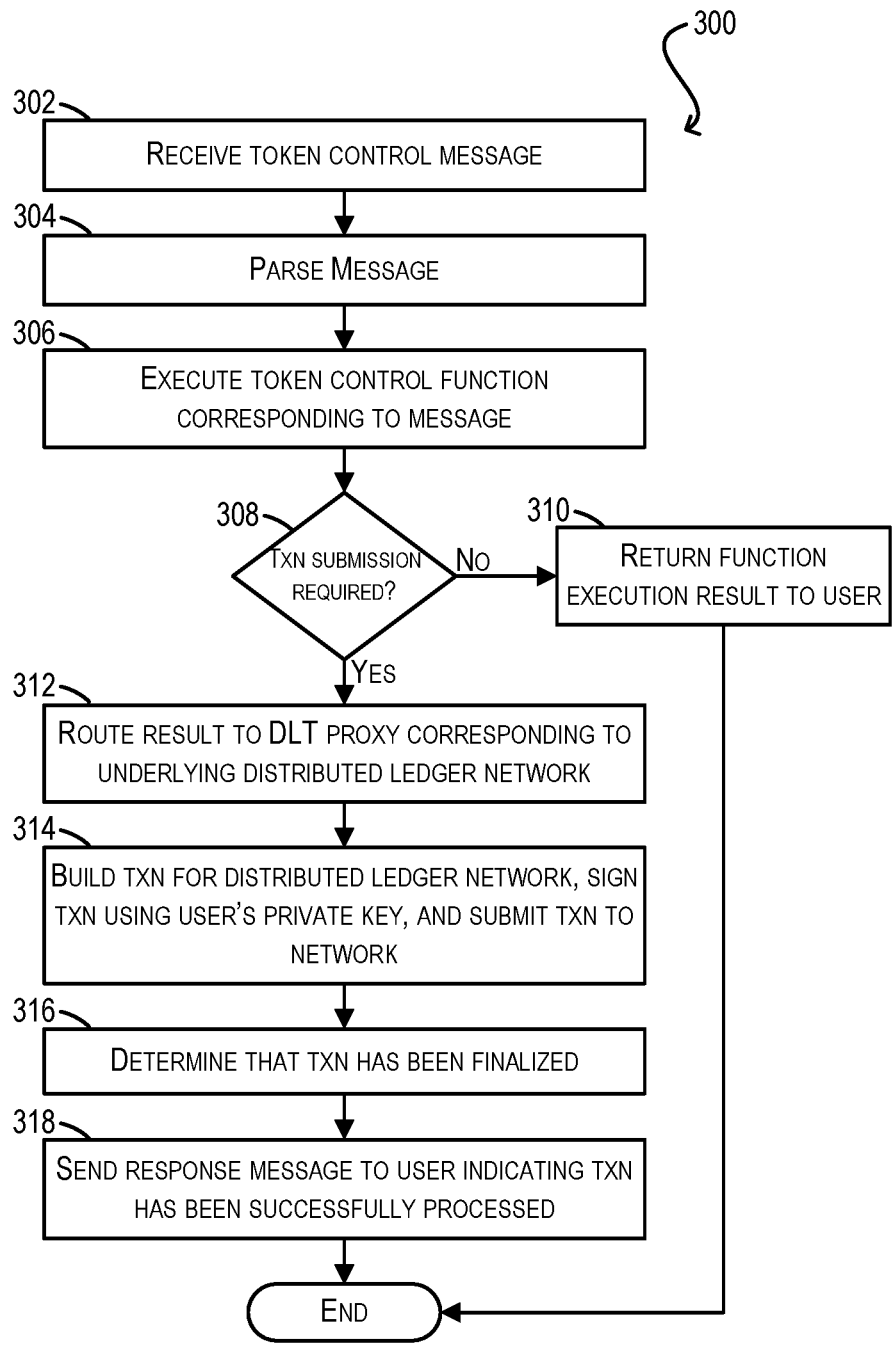
FIG. 3 depicts a workflow for processing a token control message according to certain embodiments.

FIG. 3 depicts a workflow 300 that can be executed by token service 100 of FIG. 1 for processing a token control message submitted by a user using API 108 of client interface 104 according to certain embodiments. Workflow 300 assumes that the token to which the control message applies was previously created via token service 100, such as per workflow 200 of FIG. 2, and that the user is logged into a service account that created (or has authority to manage) the token.

At blocks 302-306, token management component 112 of token service 100 can receive the token control message, parse the message, and execute a control function of the token corresponding to the message. For example, if the received control message is a request to retrieve the token balance of a particular account A (e.g., BalanceOf(A)), token management component 112 can invoke the corresponding BalanceOf control function of the token with input parameter A. As another example, if the received control message is request to transfer a quantity Q of the token from a sender S to a receiver R (e.g., TransferFrom(Q, S, R)), token management component 112 can invoke the corresponding TransferFrom control function of the token with the input parameters Q, S, and R.

If the result of the function execution at block 306 does not require a transaction submission to the token's underlying distributed ledger network 118 (block 308), token management component 112 can return the result to the user via an API message response (block 310) and workflow 300 can end.

On the other hand, if the result of the function execution does require a transaction submission (e.g., it involves a state change), token management component 112 can route the function result to a DLT proxy 116 corresponding to the underlying distributed ledger network 118 (block 312). In response, DLT proxy 116 can build, based on the result, a transaction per the rules/framework of the DLT, sign the transaction using the user's private key, and submit the transaction to distributed ledger network 118 (block 314).

After some period of time, DLT proxy 116 can determine that the transaction has been finalized and notify token management component 112 (block 316). Token management component 112 can then send a response message to the user via API 108 indicating that the transaction has been successfully processed (block 318) and terminate the workflow.

5. Token Import

Figure 4:
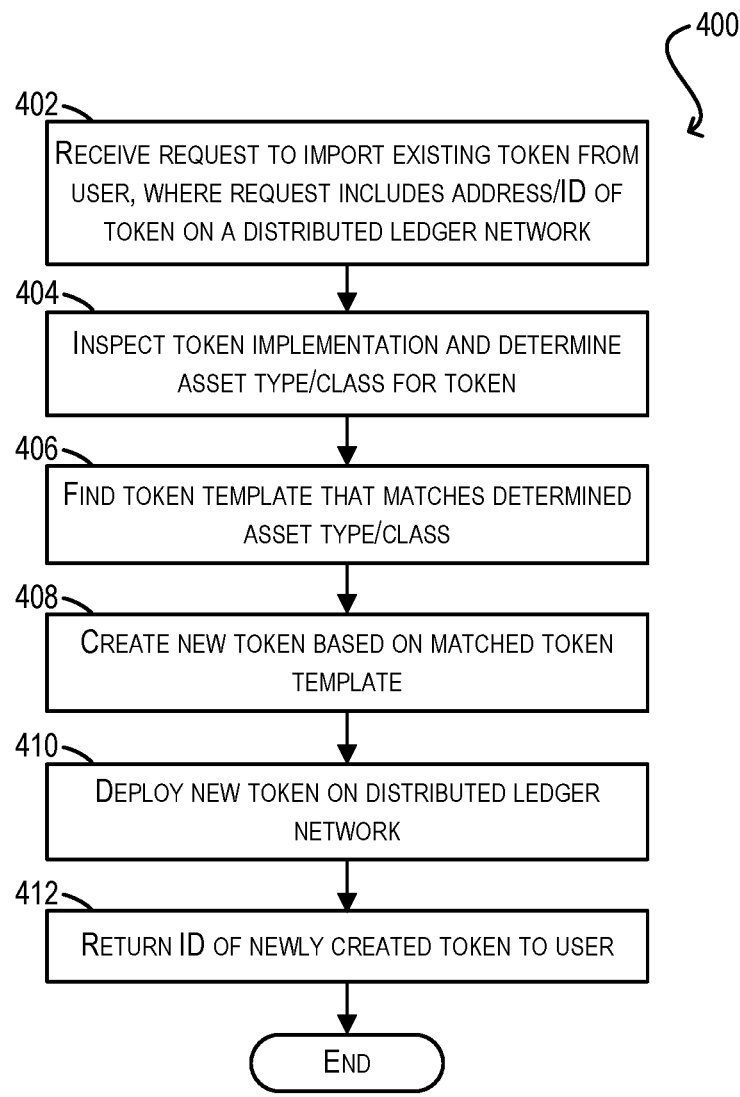
FIG. 4 depicts a workflow for importing a token according to certain embodiments.

FIG. 4 depicts a workflow 400 that can be executed by token service 100 of FIG. 1 for importing an existing token according to certain embodiments. This import process results in the creation of a new token (with the same or similar properties of the original token) that can be managed and controlled via client interface 104 of token service 100. One use case for this process is that the user may have previously created a token T outside of the context of token service 100, but now wants to manage T via service 100. Workflow 400 allows the user to accomplish this in an automated manner.

At block 402, token management component 112 of token service 100 can receive, from a user via client interface 104, a request to import an existing token, where the request includes the token's contract address/ID on a distributed ledger network 118. In response, token management component 112 can inspect the token's implementation (e.g., contract or chain code) and determine an asset type/class to which the token belongs (block 404).

Upon determining the token's asset type/class, token management component 112 can find a token template that matches that asset type/class (block 406). Token management component 112 can then create a new token based on the matched token template (block 408), where the new token includes all of the same attributes as the original token, and cause the new token to be deployed (via the appropriate DLT proxy 116) on distributed ledger network 118 (block 410). This deployment process is generally similar to blocks 218-222 of workflow 200. As part of block 410, token management component 112 can transfer the token balance associated with the user's account for the original token to a new account for the new token.

Finally, at block 412, token management component 112 can return an identifier of the newly created token to the user via interface 104 and workflow 400 can end.

6. Other Features 6.1 User-Defined Token Templates

In addition to providing a set of service-defined token templates at the time of token creation, in certain embodiments token service 100 can support an extensible framework for allowing users to define their own, custom token templates. These custom token templates may correspond to asset types/classes that are specific to particular verticals/industries, such as a "loyalty point" asset type/class, a "bond" asset type/class, etc., and can define attributes and control functions that are unique to those asset types/classes. In some cases, the custom token templates can build upon an existing service-defined token template; for example, a user-defined "loyalty point" template may build upon the base "fungible asset with variable supply" template and thus include all of attributes/control functions of that base template, in addition to further user-defined attributes/control functions.

In one set of embodiments, a custom token template that is created by one user may only be available for use by that particular user. In other embodiments, the customer token template may be published for wider use by other users, subject to review and approval by one or more administrators of the token service.

6.2 User-Defined DLT Proxies

In certain embodiments, token service 100 can also support an extensible framework that allows users to define and add their own custom DLT proxies for use by service 100. Generally speaking, this extensible proxy framework can include a common interface that allows users to provide implementation details such as the data model for representing a token and connections to the underlying distributed ledger network, key management and signing, and how to handle transaction submission, confirmation, and retries.

7. Example Computer System

Figure 5:
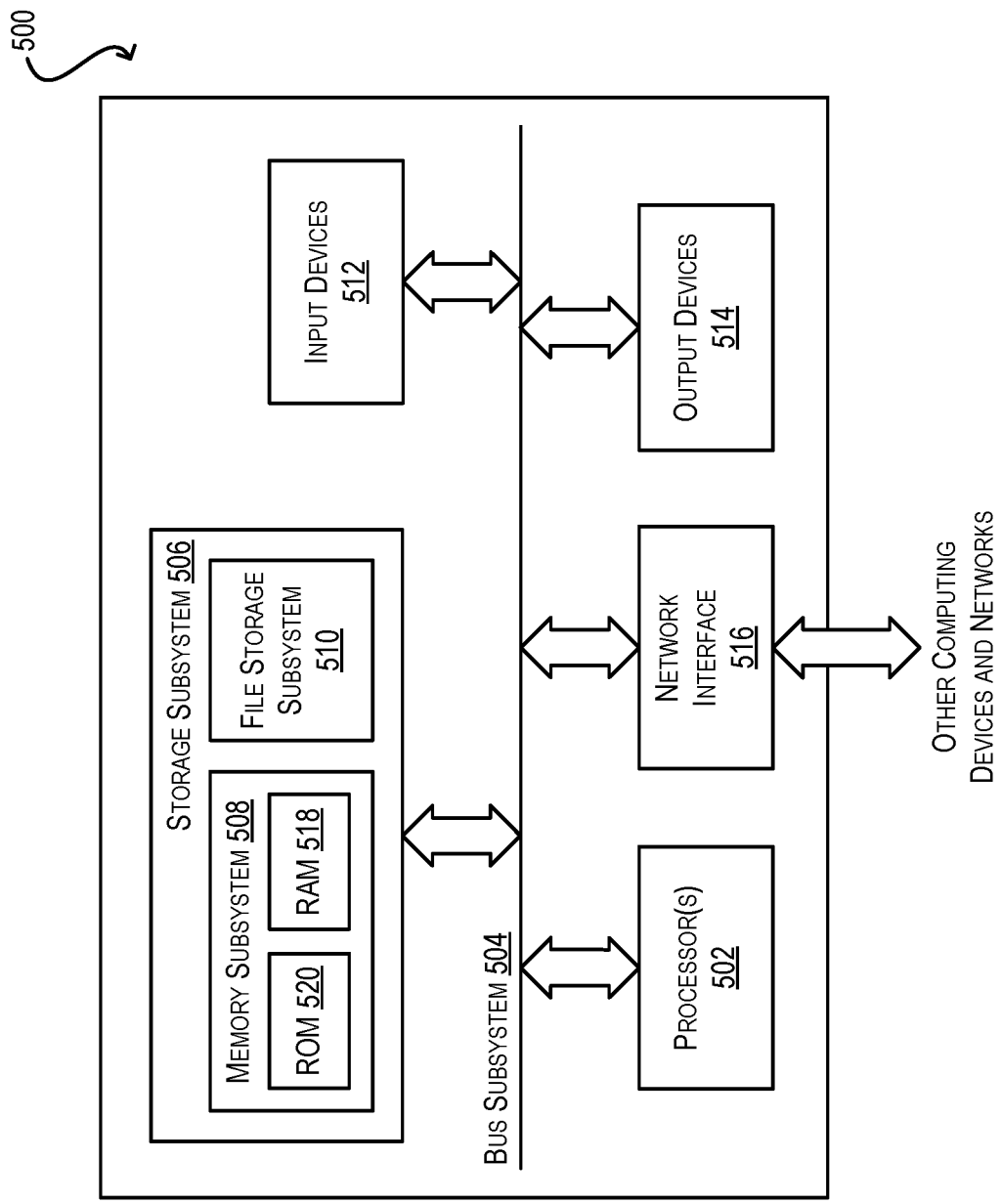
FIG. 5 depicts an example computer system according to certain embodiments.

FIG. 5 is a simplified block diagram illustrating the architecture of an example computer system 500 according to certain embodiments. Computer system 500 (and/or equivalent systems/devices) may be used to run any of the software described in the foregoing disclosure, including token service 100 of FIG. 1. As shown in FIG. 5, computer system 500 includes one or more processors 502 that communicate with a number of peripheral devices via a bus subsystem 504. These peripheral devices include a storage subsystem 506 (comprising a memory subsystem 508 and a file storage subsystem 510), user interface input devices 512, user interface output devices 514, and a network interface subsystem 516.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., an Ethernet module, a Wi-Fi and/or cellular connectivity module, and/or the like.

User interface input devices 512 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computer system 500.

User interface output devices 514 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computer system 500.

Storage subsystem 506 includes a memory subsystem 508 and a file/disk storage subsystem 510. Subsystems 508 and 510 represent non-transitory computer-readable storage media that can store program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computer system 500 is illustrative and other configurations having more or fewer components than computer system 500 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
receive, from a user, a request to create a token on a distributed ledger network, the token representing a physical or digital asset;
provide, to the user, one or more token templates, each token template corresponding to a type of physical or digital asset and defining a set of one or more attributes and one or more control functions associated with the type;
receive, from the user, a selection of a token template in the one or more token templates; and
create the token on the distributed ledger network, wherein the created token includes the set of one or more attributes and one or more control functions defined in the selected token template;
wherein creating the token comprises:
instantiating a token object;
routing the token object to a proxy specific to a distributed ledger technology (DLT) used by the distributed ledger network;
building, via the proxy, a transaction based on one or more rules of the DLT; and
submitting, via the proxy, the transaction to the distributed ledger network.

2. The computer system of claim 1 wherein the one or more token templates include at least one token template corresponding to a fungible asset type with variable supply.

3. The computer system of claim 2 wherein the one or more control functions of the at least one token template include control functions for transferring, minting, and burning quantities of the token.

4. The computer system of claim 1 wherein the one or more token templates include at least one token template corresponding to a fungible asset type with fixed supply.

5. The computer system of claim 1 wherein the one or more token templates include at least one token template corresponding to a non-fungible asset type with variable supply.

6. The computer system of claim 1 wherein the one or more token templates include at least one token template corresponding to a non-fungible asset type with fixed supply.

7. The computer system of claim 1 wherein instantiating the token object comprises instantiating the token object based on the selected token template, the token object including default logic for each of the one or more control functions inherited from the selected token template.

8. The computer system of claim 1 wherein the transaction is a first transaction, wherein the computer readable storage medium further comprises program code that causes the processor to:
receive a control message corresponding to a control function included in the token;
execute the control function and generate a function result;
route the function result to the proxy specific to the DLT used by the distributed ledger network;
build, via the proxy, a second transaction based on one or more rules of the DLT; and
submit, via the proxy, the second transaction to the distributed ledger network.

9. The computer system of claim 8 wherein building the second transaction comprises:
retrieving a cryptographic key associated with the user and the distributed ledger network; and
digitally signing the transaction using the cryptographic key.

10. The computer system of claim 1 wherein the computer readable storage medium further comprises program code that causes the processor to:
receive, from the user, a request to import an existing token, the request to import including an address of the existing token on the distributed ledger network;
inspect an implementation of the token as stored at the address;
determine an asset type for the existing token;
identify a token template in the one or more token templates that corresponds to the determined asset type; and
create another token on the distributed ledger network based on the identified token template and the existing token.

11. The computer system of claim 1 wherein at least one token template in the one or more token templates is a custom template that includes a set of one or more attributes and one or more control functions defined by the user.

12. A method comprising:
receiving, by a computer system from a user, a request to create a token on a distributed ledger network, the token representing a physical or digital asset;
providing, by the computer system to the user, one or more token templates, each token template corresponding to a type of physical or digital asset and defining a set of one or more attributes and one or more control functions associated with the type;
receiving, by the computer system from the user, a selection of a token template in the one or more token templates; and
creating, by the computer system, the token on the distributed ledger network, wherein the created token includes the set of one or more attributes and one or more control functions defined in the selected token template;
wherein creating the token comprises:
instantiating a token;
routing the token object to a proxy specific to a distributed ledger technology (DLT) used by the distributed ledger network;
building, via the proxy, a transaction based on one or more rules of the DLT; and
submitting, via the proxy, the transaction to the distributed ledger network.

13. The method of claim 12 wherein instantiating the token object comprises instantiating the token object based on the selected token template, the token object including default logic for each of the one or more control functions inherited from the selected token template.

14. The method of claim 12 wherein the transaction is a first transaction, the method further comprising:
receiving a control message corresponding to a control function included in the token;
executing the control function and generate a function result;
routing the function result to the proxy specific to the DLT used by the distributed ledger network;

building, via the proxy, a second transaction based on one or more rules of the DLT; and submitting, via the proxy, the second transaction to the distributed ledger network.

15. The method of claim 14 wherein building the second transaction comprises:

retrieving a cryptographic key associated with the user and the distributed ledger network; and digitally signing the transaction using the cryptographic key.

16. The method of claim 12 further comprising:

receiving, from the user, a request to import an existing token, the request to import including an address of the existing token on the distributed ledger network;

inspecting an implementation of the token as stored at the address;

determining an asset type for the existing token;

identifying a token template in the one or more token templates that corresponds to the determined asset type; and creating another token on the distributed ledger network based on the identified token template and the existing token.

17. The method of claim 12 wherein the one or more control functions of the at least one token template include control functions for transferring, minting, and burning quantities of the token.

18. A computer readable storage medium having stored thereon program code executable by a computer system, the program code causing the computer system to:

receive, from a user, a request to create a token on a distributed ledger network, the token representing a physical or digital asset;

provide, to the user, one or more token templates, each token template corresponding to a type of physical or digital asset and defining a set of one or more attributes and one or more control functions associated with the type;

receive, from the user, a selection of a token template in the one or more token templates; and create the token on the distributed ledger network, wherein the created token includes the set of one or more attributes and one or more control functions defined in the selected token template;

wherein creating the token comprises:

instantiating a token object based on the selected token template, the token object including default logic for each of the one or more control functions inherited from the selected token template;

routing the token object to a proxy specific to a distributed ledger technology (DLT) used by the distributed ledger network;

building, via the proxy, a transaction based on one or more rules of the DLT; and submitting, via the proxy, the transaction to the distributed ledger network.

19. The computer readable storage medium of claim 18 wherein instantiating the token object comprises instantiating the token object based on the selected token template, the token object including default logic for each of the one or more control functions inherited from the selected token template.

20. The computer readable storage medium of claim 18 wherein the transaction is a first transaction, wherein the program code further causes the computer system to:

receive a control message corresponding to a control function included in the token;

execute the control function and generate a function result;

route the function result to the proxy specific to the DLT used by the distributed ledger network;

build, via the proxy, a second transaction based on one or more rules of the DLT; and submit, via the proxy, the second transaction to the distributed ledger network.

21. The computer readable storage medium of claim 20 wherein building the second transaction comprises:

retrieving a cryptographic key associated with the user and the distributed ledger network; and digitally signing the transaction using the cryptographic key.

22. The computer readable storage medium of claim 18 wherein the program code further causes the computer system to:

receive, from the user, a request to import an existing token, the request to import including an address of the existing token on the distributed ledger network;

inspect an implementation of the token as stored at the address;

determine an asset type for the existing token;

identify a token template in the one or more token templates that corresponds to the determined asset type; and create another token on the distributed ledger network based on the identified token template and the existing token.

23. The computer readable storage medium of claim 18 wherein the one or more control functions of the at least one token template include control functions for transferring, minting, and burning quantities of the token.

* * * * *